United States Patent [19]

Hilsum et al.

[11] Patent Number: 4,717,244

[45] Date of Patent: Jan. 5, 1988

[54] ACTIVE MATRIX ADDRESSED LIQUID CRYSTAL DISPLAY WHEREIN THE NUMBER OF OVERLAP REGIONS OF THE ADDRESS LINE IS REDUCED

[75] Inventors: Cyril Hilsum, Pinner; René J. Van de Poel, London, both of England

[73] Assignee: The General Electric Company, p.l.c., England

[21] Appl. No.: 840,669

[22] Filed: Mar. 18, 1986

[30] Foreign Application Priority Data

Apr. 3, 1985 [GB] United Kingdom ............... 8508656

[51] Int. Cl.⁴ ............... G02F 1/13; G09G 3/36
[52] U.S. Cl. ............... 350/333; 350/332; 350/331 R; 340/784
[58] Field of Search ............... 350/332, 333, 350 S, 350/331 R; 340/718, 719, 784

[56] References Cited

U.S. PATENT DOCUMENTS

| 4,094,582 | 6/1978 | Goodman ............... 350/333 |
| 4,223,308 | 9/1980 | Baraff et al. ............... 340/719 |
| 4,386,352 | 5/1983 | Nonomura et al. ............... 350/333 |

FOREIGN PATENT DOCUMENTS

| 0070598 | 6/1983 | European Pat. Off. . |
| 0136509 | 4/1985 | European Pat. Off. . |
| 0145520 | 6/1985 | European Pat. Off. . |
| 2904596 | 8/1979 | Fed. Rep. of Germany . |
| 0106193 | 8/1979 | Japan ............... 340/784 |
| 2016780 | 9/1979 | United Kingdom . |
| 2103003 | 2/1983 | United Kingdom . |
| 2129183 | 3/1984 | United Kingdom . |
| 2131217 | 6/1984 | United Kingdom . |
| 2130781 | 6/1984 | United Kingdom . |
| 2133602 | 7/1984 | United Kingdom ............... 340/784 |
| 2139795 | 11/1984 | United Kingdom . |
| 2173935 | 10/1986 | United Kingdom ............... 350/334 |

OTHER PUBLICATIONS

Lechner et al., "Liquid Crystal Matrix Displays", Proceedings of the IEEE, vol. 59, No.11, Nov. 1971.

Primary Examiner—Stanley D. Miller
Assistant Examiner—Trong Quang Phan
Attorney, Agent, or Firm—Kirschstein, Kirschstewin, Ottinger & Israel

[57] ABSTRACT

An active matrix addressed liquid crystal display is described, each liquid crystal cell within the display having two electrodes each carried on a surface of a different one of two insulating plates. Each cell is connected via a respective transistor to a pair of address lines each address line within a pair being connected to different cells within the array, and each line within a pair being carried on a different plate. Synchronized electrical pulses are applied to the address lines to switch on selected cells within the array, the sense of the pulses on one of the lines being periodically changed.

7 Claims, 6 Drawing Figures

ACTIVE MATRIX ADDRESSED LIQUID CRYSTAL DISPLAY WHEREIN THE NUMBER OF OVERLAP REGIONS OF THE ADDRESS LINE IS REDUCED

BACKGROUND OF THE INVENTION

1. Field of the Invention

This invention relates to liquid crystal displays In particular the invention relates to liquid crystal displays of the kind comprising a two dimensional array of liquid crystal cells, each cell having two electrodes each carried on a surface of a respective one of two plates, each cell being switchable by means of electrical signals applied to a respective pair of electrical address lines connected to the cell, each address line within a pair being connected to a different plurality of cells within the array.

2. Description of Related Art

To overcome the problems of multiplexing the address lines in such a display, i.e. in order to uniquely identify the cell to be switched at any one time and prevent partial switching of other cells connected to one of the pair of address lines, it is known to connect each cell to its respective pair of address lines via a respective electrical switch, for example a thin film transistor, i.e. the so-called "active matrix addressing" approach.

FIG. 1 is a schematic circuit diagram of part of such a known display.

Referring to FIG. 1, the display comprises an array of liquid crystal cells, each cell 1 being represented in the FIGURE as a capacitor. One electrode 3 of each cell is carried on the inner surface of a first insulating plate, this plate being transparent, the electrode 3 being the size of a pixel of the display, and being made of a transparent conductor such as indium tin oxide. The other electrode 5 of each cell 1 is defined on the opposing surface of a second insulating plate, this surface carrying a conductive layer effective to form an earth plane, all components carried on this second plate being shown as dotted in the figure.

In respect of each cell 1, there is provided a respective n channel thin film field effect transistor 7 carried on the first plate. One main electrode of each transistor, hereinafter referred to as a drain for convenience, is connected to the electrode 3 of the cell 1, while the gate and other main electrode of transistor 7 hereinafter referred to as a source for convenience, are connected to a selected gate address line 9, 11 or 13 and a selected source address line 15, 17 or 19 respectively within a grid of address lines in the form of conductive tracks on the first plate, the gate lines 9, 11, 13 extending at right angles to the source lines 15, 17, 19 as indicated in the figure.

In use of the display, appropriate synchronized gate and source voltage pulses are applied to a selected pair of gate and source address lines, the sense of the pulses to the source line being periodically changed to avoid electrolysis of the liquid crystal being addressed. This then selectively switches on the one transistor 7 which is connected to both the selected address lines. The capacitor constituted by the cell 1 connected to the selected transistor 7 is then able to charge up to the voltage required to give an usual response in the liquid crystal cell, the capacitor then being isolated when the transistor is subsequently switched off, the charge held on the capacitor being effective to switch the cell in the sense of changing the reflectivity of the liquid crystal and thus producing the required pixel image.

Such a known display suffers the disadvantage however, that there will necessarily be n sites on the plate array, where the conducting tracks constituting the gate and source address lines cross each other. Such overlaps are prone to give short-circuits if the insulator between the two conductors is faulty, or open circuits if one of the conductive tracks breaks where it is taken over the edge of the insulator.

SUMMARY OF THE INVENTION

It is an object of the present invention to provide a liquid crystal display of the kind specified, in which each liquid crystal is addressed via a respective transistor means, but wherein the number of overlap region of the address lines is reduced.

According to the present invention a liquid crystal display comprises a two dimensional array of pixels each constituted by at least one liquid crystal cell, each cell having two electrodes each carried on a surface of a respective one of two plates, each cell being connected to a pair of electrical address lines by a respective transistor means, each address line within a pair being connected to a different plurality of pixels within the array and being carried on a different one of the plates, and means for applying electrical signals in the form of synchronized pulses to a selected one of said pairs of electrical address lines so as to switch the cell within the pixel connected to said selected pair, the sense of the pulses applied to one of the selected lines being periodically changed.

BRIEF DESCRIPTION OF THE DRAWINGS

Three liquid crystal displays, in accordance with the invention, will now be described by way of example with reference to FIGS. 2 to 4 of the accompanying drawings in which.

DETAILED DESCRIPTION OF THE PREFERRED EMBODIMENTS

Figure 1:
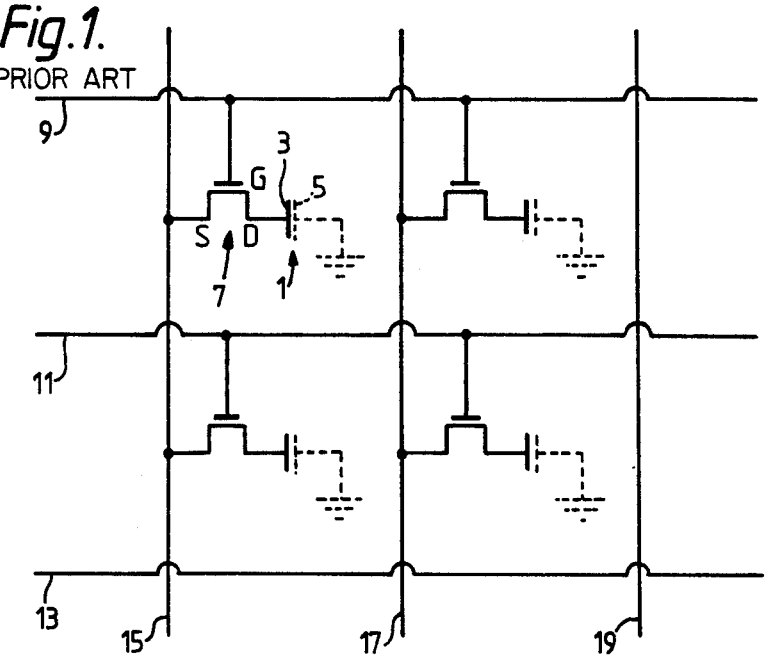
Figure 2:
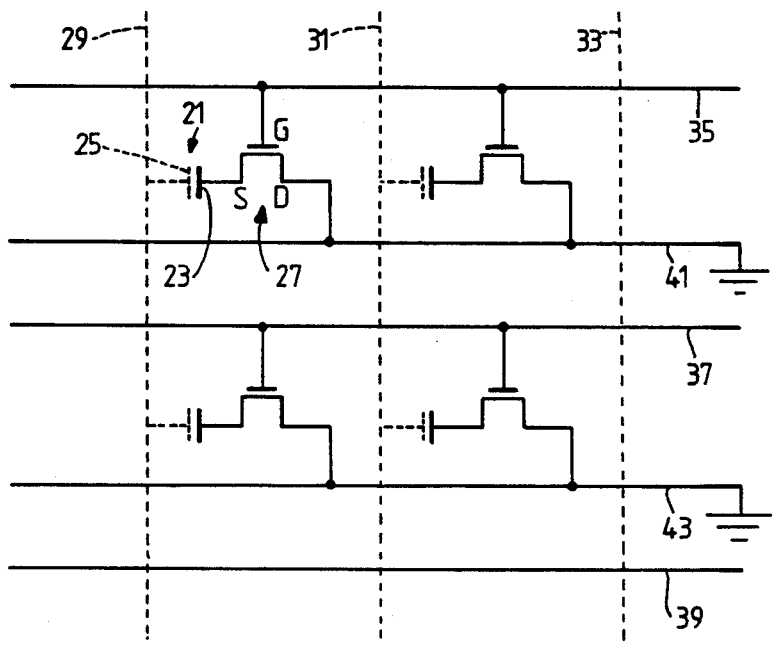
FIG. 2 is a schematic circuit diagram of part of the first display.

Referring firstly to FIG. 2, as in the prior art display described herebefore with reference to FIG. 1, the display comprises an array of liquid crystal cells again represented as capacitors 21. The electrodes 23, 25 of each cell are formed on the opposing surfaces of a pair of parallel insulating plates, all components carried on the second of the plates being shown dotted. Unlike the prior art display however, on electrode 23 of each cell is connected to the nominal source of a respective n channel thin film field effect transistor 27 carried on the same plate as the electrode 23. The other electrode 25 of each cell is defined within one of a series of parallel conductive tracks 29, 31, 33 carried on the second plate. The gate and nominal drain of each transistor 27 is connected to a selected pair of conductive tracks running parallel to each other across the first plate, but at right angles to the tracks carried on the second plate, alternate tracks across the first plate constituting gate address lines 36, 37 39 and earth lines 41, 43.

Figure 3:
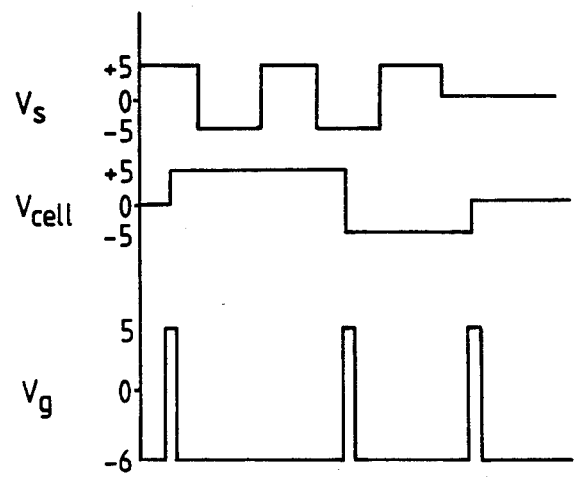
FIG. 3 illustrates the voltage waveforms applied to the display.

Referring now also to FIG. 3, in use of the display, a driving voltage $V_g$ with respect to earth is applied to a selected gate line or lines while a driving voltage $V_s$ with respect to earth is applied to selected source line or lines. Thus the selected cells 21 will be charged to a voltage cell equal to the turn on voltage of the cells, alternation of the sense of the voltage pulses on the source lines causing the polarity of the voltage applied across the selected cells to periodically alter so as to avoid electrolysis of the cells.

Thus by a display in accordance with the invention, the problem of overlapping address lines on one of the plates is avoided. The gate lines 35, 37, 39 and the earch lines 41, 43 may be connected to edge connectors at different edges of the first plate, or alternatively a suitable edge connector may be used to provide electrical connection to all the lines 35, 37, 39, 41, 43 at a single edge of the plate, the edge connector having linked earth pins. In yet another alternate display the earth lines 41, 43 may be arranged to pass beyond the connector for the gate lines 35, 37, 39. It will be appreciated however, that even if it is convenient in some circumstances to provide a bus bar for linking the earth lines 41, 43, the bus bar crossing over or under the gate lines 35, 37, 39 the number of overlap regions is still vastly reduced over those necessary in the prior art display, only one such overlap being required for each row within the array. It will also be appreciated that the edge connectors may be replaced by driving circuit and shift register chips mounted around the periphery of the display, with soldered contacts being made to the earth and gate lines.

In a more complex form of device operation, the lines 41, 43 can be operated with appropriate bias pulses. This can be used to improve display performance, or to enable transistors with less favourable electrical characteristics to be used.

Figure 4:
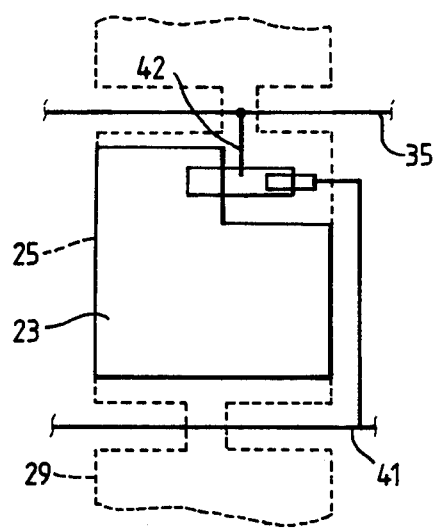
FIG. 4 is a schematic plan view of the circuit elements of part of the first display.

Turning now to FIG. 4 an additional advantage of a display in accordance with the invention is that a particularly space efficient component configuration is possible. Thus each electrode 23 may extend to cover nearly all the available area between each pair of gate 35, 37, 39 and earth lines 41, 48, the thin film transistor 27 occupying an area corresponding to a corner of the electrode 23. The source lines 29, 31, 33 on the second plate are then formed as conductive stripes of the same width as the electrode 23. It is however advantageous to narrow down the stripes in the region of the gate and earth lines 34, 41 as shown in order to minimize the capitance loading of the transistors. It is also particularly advantageous that individual conductive tracks 42 be formed between the gate lines 35, 37, 39 and each transistor 27. Where a transistor 27 is found to be faulty, it is then possible to disconnect the faulty transistor from the gate line by severing the corresponding individual track by, for example, use of a high definition laser.

Figure 5:
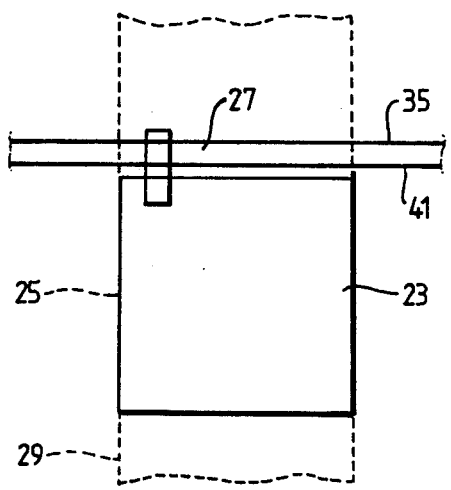
FIG. 5 is a schematic plan view of the circuit elements of part of the second display.

Referring now to FIG. 5, in an alternative component configuration to that shown in FIG. 4, the gate and earth lines may be formed on the same side of the electrode 23, this allowing an even larger cell electrode area.

Figure 6:
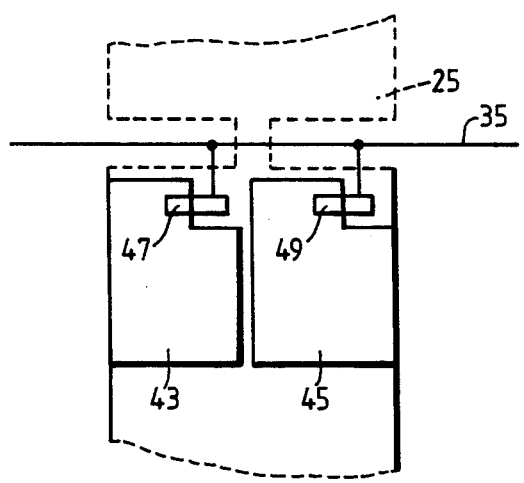
FIG. 6 is a schematic plan view of the circuit elements of part of the third display.

Referring now to FIG. 6, in a second alternative configuration each pixel of the display is constituted by two individual liquid crystal cells. Thus for each pixel under each column source line carried on the second plate there are formed on the first plate two electrodes 43, 45 lying side by side each connected to the same row gate line carried on the first plate by a respective transistors 47, 49. In the event of failure of one of the transistors 47, 49, the cell connected to the surviving transistor may still be switched.

It will be appreciated that while in the prior art display, and the displays in accordance with the invention described by way of example, only four liquid crystal cells are shown in practice the displays will have 1000×600 or more cells, displays in accordance with the invention having particular advantages in displays having large numbers of liquid crystal cells.

It will also be appreciated that while in the prior art display and the displays in accordance with the invention described by way of example an n channel thin film field effect transistor is used to connect each cell to its respective pair of address lines, a p channel thin film field effect transistor, or indeed any appropriate transistor means may be used.

It will also be appreciated that while in the display described hereinbefore by way of example, the liquid crystal are contained between a pair of insulating plates, a display in accordance with the invention may be formed in which one plate of the display is a semiconductor crystal in which electrical switches are fabricated.

We claim:

1. A liquid crystal display comprising: a two-dimensional array of pixels, each constituted by at least one liquid crystal cell, each cell having two electrodes, each carried on a surface of a respective one of two plates, each cell being connected to a pair of electrical address lines by a respective transistor means, each address line within a pair being connected to a different plurality of pixels within the array and being carried on a different one of the plates, each cell being switchable by means of electrical signals applied to selected ones of said pairs of address lines within the pixel connected to said selected pair, the pulses applied to the selected lines being such that the polarity of the voltage applied across each cell periodically alters.

2. A display in accordance with claim 1 in which the transistor means is in the form of a thin film transistor carried on one of the plates.

3. A display in accordance with claim 2 in which each address line carried on the other plate to that carrying the transistor is a stripe of substantially the same width as a pixel of the display.

4. A display in accordance with claim 3 in which the width of each stripe carried on said other plate is narrowed in the region where it crosses the address lines carried on said one plate.

5. A display in accordance with claim 1 in which each transistor means is connected to one of the address lines via an individual conductive track which may be severed in the event of failure of the transistor means.

6. A display in accordance with claim 1 in which each pixel of the display includes a plurality of individual liquid crystal cells.

7. A display in accordance with claim 1 including means for applying said electrical signals to said selected address lines, said electrical signals being in the form of synchronized pulses, the sense of the pulses applied to one of the selected lines being periodically changed.

* * * * *